United States Patent Office 3,789,019
Patented Jan. 29, 1974

3,789,019
PREPARATION OF CATALYSTS USEFUL IN
OXIDATION OF SO₂ GASES
Alvin B. Stiles, Wilmington, Del., assignor to E. I. Du
Pont de Nemours and Company, Wilmington, Del.
No Drawing. Filed Dec. 27, 1971, Ser. No. 212,761
Int. Cl. B01j 11/06, 11/22
U.S. Cl. 252—440                                    35 Claims

ABSTRACT OF THE DISCLOSURE

This invention relates to a process for preparing a catalytic material having high efficiency in the oxidation of $SO_2$ to $SO_3$ which entails preparing a homogeneous mixture comprising a catalytically effective amount of a primary catalytic material selected from the group of $CsVO_3$ or $RbVO_3$, a promoter, and a carrier material comprising diatomaceous earth; and then drying the mixture to provide the catalyst.

BACKGROUND OF THE INVENTION

In recent years the elimination of various contaminants from our environment has become important. One of the most troublesome contaminants is sulfur dioxide. Sulfur dioxide is produced by the burning of various fuels, i.e., in electric power generation, industrial, domestic and vehicular fuel use, the smelting of ores, the recovery of sulfur from a sulfur compound-bearing gas stream, oil refining, and also as an intermediate in the manufacture of sulfuric acid. Many processes have been proposed for the removal of sulfur dioxide from the off gases of these processes, particularly the off gas from sulfuric acid manufacture. Some of these processes involves the conversion of sulfur dioxide to elemental sulfur while others involve sulfur dioxide removal with a liquid sorbent, still others with a dry sorbent and finally multiple stage catalytic oxidation, or catalytic oxidation with interpass absorption. All of these prior art processes present an economic problem to the industry involved.

Assignee's copending application Ser. No. 173,247, filed Aug. 19, 1971, describes a process wherein the $SO_2$ content of the off gases from sulfuric acid plants can be reduced to acceptable levels by incorporating a low temperature, high efficiency $SO_2$ oxidation catalyst, e.g., supported platinum, rubidium-promoted vanadate, or a cesium promoted vanadate composition, in at least the last stage of a multi-stage catalytic converter, and subsequently contacting the off gas with an aqueous sulfuric acid solution containing $H_2O_2$ or a peroxy acid of sulfur. Therefore a highly efficient, low temperature oxidation catalyst in the converter is important in order to reduce $SO_2$ levels in the off gas, thus reducing peroxide or peroxy acid consumption which concomitantly permits a large reduction in size of the peroxide or peroxy acid contacting tower.

It is important to have a low temperature catalyst in at least the final stage of $SO_2$ to $SO_3$ conversion since equilibrium favors $SO_3$ as the temperature is lowered. For instance, the equilibrium relationship where the inlet $SO_2$ percent is 10% in the range of 400 to 600° is pointed out below:

| Temperature (° C.): | Percent conversion |
|---|---|
| 400 | 99.21 |
| 420 | 98.72 |
| 450 | 97.53 |
| 480 | 95.50 |
| 500 | 93.53 |
| 520 | 90.95 |
| 540 | 87.72 |
| 560 | 83.79 |
| 600 | 74.04 |

From the above data it is thus seen that in going from a catalyst that is effective at 480° C. to one that is effective at 450° C., the $SO_2$ leakage in the off gases of a converter would be reduced by 45.2% (182% more $SO_2$ leakage at 480° C. than at 450° C.). However, in going from a temperature of 480° C. to 400° C. the $SO_2$ leakage would be reduced by 82.4% (570% more $SO_2$ leakage at 480° C. than at 400° C.).

Whenever the $H_2O_2$ cleanup procedure for the $SO_2$ leakage described above is utilized, a corresponding decrease in the $H_2O_2$ (or peroxy acid of sulfur) consumption is achieved.

U.S. Pat. 1,941,426 to Beardsley et al. (dated Dec. 26, 1933) discloses the preparation of cesium vanadate by reacting ammonium metavanadate and cesium chloride together. The catalytic material is then placed on a carrier comprising chips of Celite. The catalytic material is stated to be useful in the method of making sulfur trioxide. However the catalyst of Beardsley et al. does not have a high efficiency (see applicant's Examples 20 and 21). It is known in the art that the chloride ions poison the catalyst (see Duecker & West, The Manufacture of Sulphuric Acid, Reinhold, 1959, p. 184), but most critically, applicant has found that the primary catalytic material (cesium vanadate) must be prepared in an intimate homogeneous mixture with the promoters and carrier material as opposed to impregnating the solid support with the primary catalytic material as taught by Beardsley. Applicant's procedure would seem to be in the wrong direction for the production of a low cost, low temperature, catalytic material because the expensive cesium component is intermixed with and consequently diluted by the carrier which would usurp a large fraction of the surface available for reaction. This is in contrast to the coated support of Beardsley which presents a surface entirely coated by the coating-impregnating procedural step.

Various combinations of cesium promoted vanadate catalysts in conjunction with promoters and/or activators have been disclosed in the art as being advantageous in obtaining low temperatures and greater efficiency in the conversion of $SO_2$ to $SO_3$ (see Duecker & West, The Manufacture of Sulphuric Acid, Reinhold, 1959; pp. 171–176). However, cesium is expensive and also catalysts thus far taught in the art are inadequate in the objective at low $SO_2$ leakage and consequently catalysts having even greater activity are desired.

The catalyst produced by the process of this invention provides such a catalyst having greater efficiency in the conversion of $SO_2$ to $SO_3$ and requires less expensive ingredients than previously known catalysts.

SUMMARY OF THE INVENTION

It has been discovered that a catalyst having a high efficiency for the oxidation of $SO_2$ to $SO_3$ is provided by a process which comprises preparing a homogeneous mixture comprising a catalytically effective amount of a primary catalytic material selected from the group of $CsVO_3$ or $RbVO_3$, a promoter, and a carrier material comprising diatomaceous earth; and then drying the mixture to provide the catalyst.

$CsVO_3$ is preferred as the primary material and it is also preferred to preform the $CsVO_3$ prior to peparing the homogeneous mixture in the form of a slurry. Good results are obtained, however, by forming the $CsVO_3$ in situ in the mixture by including reactants that provide the $CsVO_3$ upon heating. Preferred reactants are $NH_4VO_3$ and $CsOH$ and a temperature within the range of 50–100° C. is preferable.

A preferred promoter is an alkali metal sulfate with chromium potassium sulfate being most preferable. Good results are also obtained by including $Cs_2SO_4$ and/or $K_2SO_4$ along with the cromium potassium sulfate.

It is desirable to include at least one activator selected from the group of sulfates of cobalt, nickel, and iron as their normal hydrates in the homogeneous mixture.

Desirable results are provided by including $NaVO_3$ along with $CsVO_3$ as the primary catalytic material.

It is most preferred that the carrier material comprise a mixture of diatomaceous earth and colloidal silica. In addition to diatomaceous earth, other refractory oxides such as alumina, quartz, silica-alumina, mullite, titania, zirconia and others can be used as carriers. These ordinarily will have a strong X-ray crystal orientation pattern. When considering the amorphous nature of the finished catalyst, the crystallinity of the carrier is of course of no consequence, the pattern can be isolated and is ignored. The amorphous nature of the catalyst characterizes all components other than the highly crystalline carrier.

It is desirable to calcine the catalyst by heating to a temperature within the range of 250–800° C.

Prior to use of the catalyst, it is desirable to form the catalyst into self-supporting shapes.

The product of the invention is a catalyst prepared by the above described processes. The catalyst, other than the carrier material, is amorphous (i.e., has crystallite size less than 100 A.).

DETAILED DESCRIPTION OF THE INVENTION

The process of this invention is applicable to the preparation of a high efficiency catalyst that is useful in the conversion of $SO_2$ to $SO_3$. The catalytic material is particularly useful in reducing the $SO_2$ emissions from the final conversion stage of $SO_2$ to $SO_3$ in a sulfuric acid process.

The catalytic material is particularly useful in a sulfuric acid process coupled with an $SO_2$ recovery operation involving $H_2O_2$ or a persulfuric acid solution as described in assignee's copending U.S. application Ser. No. 173,247, filed Aug. 19, 1971.

The catalysts prepared by the process of this invention are amorphous and they remain in a substantially amorphous state after continued use in an $SO_2$ to $SO_3$ converter. Such an amorphous state is known to be highly desirable in the catalytic art. However, it is rather surprising that a material of an amorphous structure is produced despit the fact that the starting materials are crystalline; these become amorphous when they are subjected to the processing in accordance with the invention.

The catalysts prepared according to the process of the invention are preferably converted into self-supporting shapes for use in a converter by conventional shape-forming methods; i.e., extrusion, pressing, pelleting, or granulation and classification to a desired mesh size.

There is some confusion in the art regarding the terms "promoters" and "activators." Applicant's use of "promoter" refers to promoters such as alkali metal sulfates, while "activators" refers to such compounds as the sulfates of iron, nickel, and cobalt as their normal hydrates.

In the examples, unless otherwise indicated all parts are by weight. All performance data for the examples illustrating this invention as well as performance data for art comparisons or control experiments are recorded in Table I.

Example 1

A solution is prepared by dissolving 40 parts by weight of ammonium metavanadate and 56 parts by weight of a 50% solution of cesium hydroxide in 350 parts by weight of distilled water at 95° C. At this temperature, solution is complete and a reaction product forms between the cesium and the vanadate ions to form cesium vanadate.

A solution-slurry is prepared by dissolving a promoter of 40 parts by weight of potassium chrome alum [$K_2Cr_2(SO_4)_4 \cdot 24H_2O$], 40 parts by weight of potassium sulfate, and 150 parts by weight of powdered diatomaceous earth in 600 ml. of distilled water, and an activator of 50 parts by weight of a solution of 0.75 part each of the sulfates of Co, Ni, and Fe as their normal hydrates. The solution-slurry is very rapidly agitated to effect complete solution of the soluble salts and complete suspension of the finely powdered diatomaceous earth.

There is separately weighed out 450 parts by weight of a colloidal dispersion of silica having a solids content of 30% and being comprised of spheroidal particles 70 A. in diameter.

With the cesium vanadate solution of the first paragraph being rapidly agitated, the solution slurry of the second paragraph is rapidly added over a 15-second period. Agitation is continued until the slurry becomes uniform, requiring approximately 1 minute. Thereafter, the colloidal silica is also added to the rapidly agitating slurry over a period of 15 seconds. Agitation and heating are continued until the temperature reaches 70° at which temperature the agitation is continued and the temperature maintained for an additional 60 minutes.

The slurry thus produced is placed in a large evaporating dish and evaporated to dryness with intermittent stirring to assure uniform dispersion of the components and gelled materials. After drying, the product is calcined at 300° C. for two hours to bring the ingredients to a uniform state of oxidation (thus avoiding any induction period).

Thereafter, the granules are crushed and screened to produce a 6–10 mesh fraction and fines.

The catalyst was analyzed by X-ray diffraction technique and was determined to be completely amorphous (surprising but highly desirable) except for the silica component of the diatomaceous earth. The 6–10 mesh granular material was tested as described in the following paragraph:

An externally heated tubular reactor is fabricated in such a way as to permit the installation of catalyst in the heated portion of the tube. The tube is closed except at each end which allows for entrance of gas at one end and exiting at the other. Meters are provided for measurement of $SO_2$ and air flows which in turn permit the derivation of gas streams comprising various mixtures of $SO_2$ in air.

A mixed gas stream which is fed to the reactor comprises 8 parts by volume of $SO_2$ and 92 parts by volume of air. A volume of the gas mixture equal to 40 times the volume of the catalyst bed is passed over the catalyst each minute providing a space velocity of 2400 corresponding to the overall rate in a commercial sulfuric acid unit. The temperature of the catalyst and gas is gradually increased until approximately 300° C. is reached at which point a reaction generally is obtained. The temperature is varied until such time as the minimum leakage of $SO_2$ (maximum conversion of $SO_2$ to $SO_3$) is obtained.

The exit gas is scrubbed free of $SO_3$ then an $SO_2$ analysis is obtained on the residual "off gas" by gas chromatograph procedure. A record is maintained of the sulfur dioxide leakage, the hot spot temperature within the reactor, and the space velocity.

The operation thus described simulates a single stage of a multi-stage sulfuric acid manufacturing reactor. In the commercial production of sulfuric acid the converters are multi-staged in order to minimize sulfur dioxide leakage with consequent pollution and economic loss problems. Consequently, to evaluate the performance of the catalyst when in a downstream stage of a multi-staged reactor, a second reactor identical to the first reactor is fabricated. The equipment is set up in such away that the exit gas from the first stage reactor is fed to a second identical reactor charged with a smaller volume of catalyst than that in the first stage; the gas stream passing through the second stage is at a space velocity of 3600.

A test similar in gas flow, operating temperature conditions but with 91% air and 9% $SO_2$ is initiated and the gas effluent from the first reactor is passed into the second reactor with the temperature being adjusted to the point where minimum $SO_2$ leakage is encountered. The mehod of analysis is the same as previously described herein, i.e. by gas chromatograph technique. A record is made of the hot spot temperature within the converter, $SO_2$ leakage and space velocity. Data obtained for the catalyst of this example when evaluated by both single stage and two stage conditions are tabulated subsequently.

A test of the identical type described above is conducted on a standard commercial catalyst comprising approximately 11% ammonium vanadate, approximately 30% mixed potassium sulfate and potassium aluminum sulfate as a promoter and an activator of 1% iron sulfate together with approximately 58% diatomaceous earth as the carrier. This material was mixed with water to make a paste which was extruded, dried, calcined at 300° C. and finally crushed and screened to derive 6–10 mesh granules. Performance of this catalyst was also determined and recorded in Table I.

Purchased catalysts from several commercial vendors identified only as Vendor 1, 2 and 3 (Monsanto; CD & E "Q" Vanadium Pentoxide Catalyst; and Haldore-Topsoe, respectively) were also obtained, crushed and screened and evaluated. All data are in Table I.

X-ray data were obtained for the catalyst prepared initially in this example, for the catalyst prepared by commercial techniques and also for the purchased material. The catalyst prepared containing cesium vanadate as initially described in this example gave an amorphous pattern (except for cristobalite from the diatomaceous earth) even after continued exposure to operating conditions. This is in contrast to the purchased catalysts or that prepared by commercial techniques from art components; these all had sharp crystal patterns.

Example 2

A catalyst is prepared similarly to the procedure described in Example 1 with the exception that the solution of vanadate and cesium salts are made up using 80 parts by weight of ammonium metavanadate and 112 parts by weight of the 50% solution of cesium hydroxide. Seven hundred milliliters of distilled water is used in this preparation.

There is also a change in the composition of the solution-slurry of the potassium salts with the diatomaceous earth in that instead of using 40 parts by weight of potassium chrome alum, there is used only 20 parts by weight. To replace this unused 20 parts by weight of potassium chrome alum, there is used 20 parts by weight of cesium sulfate.

The preparation is continued as for Example 1, together with the testing, analytical, and X-ray determinations. The X-ray pattern both before and after activity testing of this material was also amorphous except for the cristobalite of the diatomaceous earth. The performance data are also recorded in a subsequent tabulation.

Example 3

This sample is prepared similarly to Example 2, with the exception that rubidium sulfate is used to replace all of the cesium sulfate. Evaluation of the catalyst is performed as described in Example 1 with the results also being tabulated subsequently. X-ray data indicate that the crystallite size is less than 80 A. except for the cristobalite of the diatomaceous earth. The X-ray diffraction data indicates that the catalyst not only is essentially amorphous when prepared, but the composition is such that it maintains its amorphous structure during use.

Example 4

A catalyst is prepared in which the components are as follows: 40 parts of ammonium vanadate, 28 parts of 50% cesium hydroxide, and 29 parts of silver nitrate in 350 ml. of distilled water heated to 90° C. Silver vanadate forms as a precipitate so that a complete solution is not achieved in this example. The remaining preparation is identical to the procedures used in Example 1 above. The preparation proceeds as for Example 1 to the point where the catalyst is essentially dry but is semi-plastic. At this point, the paste is extruded to form extrudate which is scored with a knife so that on drying it produces 3/16" by 3/16" granules, essentially cylindrical in shape. These are evaluated in this condition and are also crushed and screened to form 6–10 mesh granules and also 16–20 mesh granules. All are evaluated by X-ray and by the activity determination techniques. The catalyst showed no X-ray pattern except for the cristobalite pattern for the diatomaceous earth. All other structure is amorphous and has crystallites smaller than 80 A. in diameter. Activity data for the catalyst of this example are also tabulated subsequently.

Example 5

For this example, the procedure consists in preparing a solution comprising 40 parts by weight of ammonium vanadate and 40 parts by weight of rubidium carbonate which are dissolved in 350 ml. of distilled water, complete solution being attained at a temperature of 88° C. The remainder of this example involves procedures identical to those used in Example 1 to the point where granules 6–10 mesh in size are prepared. The product of this example is examined both by X-ray diffraction and by activity determination techniques. Activity data are tabulated subsequently. X-ray diffraction information indicates no crystalline material with the exception of cristobalite present as diatomaceous earth. No crystallinity developed even after extended periods of use for the $SO_2$ to $SO_3$ reaction.

Example 6

The purpose of this example is to derive a catalyst having lower cost than that containing the vanadate ion completely converted to cesium vanadate. In this preparation stoichiometrically one half of the vanadate ion is converted to sodium vanadate whereas only the remaining half is present as cesium vanadate. The ingredient composition is as follows: 40 parts by weight of ammonium metavanadate, 28 parts by weight of 50% solution of cesium hydroxide, and 6 parts by weight of sodium hydroxide are dissolved in 350 ml. of distilled water at 87° C.

The remaining operations in this preparation are the same as those employed in Example 1 to the point where the granules as 6–10 mesh particles have been obtained.

The catalyst thus derived is evaluated by X-ray diffraction and by activity determination techniques. The activity information is included in the summary tabulation subsequently. The X-ray dffraction information indicates the absence of crystallinity with the exception of the cristobalite structure. By absence of crystallinity is meant that the structure is essentially amorphous having crystallite sizes smaller than 80 A. in diameter.

Example 7

A solution was prepared comprising 60 parts by weight of ammonium metavanadate and 56 parts by weight of a 50% solution of cesium hydroxide in 350 ml. of distilled water heated to 100° C. At 100° C. the materials go completely into solution. This preparation was made to provide a catalyst having excess vanadate over that stoichiometrically required to produce cesium metavanadate. Thus, there is present in this solution cesium vanadate with excess vanadate ions.

All other operations of the preparation are identical to those used in Example 1 to the point where the 6–10 mesh granules had been derived.

X-ray diffraction data like pervious preparations of these examples, showed all crystallites to be smaller than 100 A. with the exception of the cristobalite of the diatomaceous earth. This was true both for the new and used catalysts. The data obtained during the activity evaluation are tabulated subsequently.

Example 8

This preparation is similar to that of Example 7 with the exception that still large excesses of vanadate ion are added. The ingredients consisted of 100 parts by weight of ammonium metavanadate and 56 parts by weight of 50% cesium hydroxide solution in 350 ml. of distilled water. Solution is essentially complete but there is some murkiness in the liquid at 100° C.

The remaining operations in this preparation are identical to those of Example 7 to the point of preparation of the 6–10 granules.

The resultant material is evaluated for activity with the results being tabulated subsequently.

X-ray diffraction data indicated only the crystallinity of the cristobalite whereas other components had essentially a completely amorphous structure, even after extended exposure to testing conditions.

Example 9

This preparation has as its purpose the modification of the procedure to effect preparation by a milling or kneading technique as an alternate to the solution-slurry technique previously employed. The following ingredients are placed in a Reedco laboratory mixer having sigma type blades and a rubbing or abrading action of the blades against the wall: seventy parts by weight of finely powdered diatomaceous earth, 20 parts by weight of ammonium metavanadate, 28 parts by weight of a 50% solution of cesium hydroxide, 25 parts by weight of a solution containing 0.38 of a part each of cobalt, nickel, and iron sulfates as their penta hydrates, 20 parts by weight of potassium chrome alum, 20 parts by weight of potassium sulfate, and 240 parts by weight of a 30% colloidal dispersion of silica in aqueous media. The spherulites of the silica are 70 A. in diameter.

The foregoing ingredients are mixed for approximately 60 minutes to produce a thick paste. The kneading is accompanied by heating of the jacket to partially remove water during the mixing operation.

The catalyst is removed from the kneader and dried, then converted to granules as for Example 1.

The granules are evaluated by X-ray and activity determination techniques with the result that no crystallinity other than the cristobalite was evident. The activity information is tabulated subsequently.

Example 10

The catalyst of this example (Prior art—Duecker and West, Manufacture of Sulfuric Acid, Reinhold, 1959) is prepared by the technique employing the kneader as in Example 9. The ingredients are as follows: 144.3 parts $Cs_2SO_4$, 38.6 parts $NH_4VO_3$, 13.8 parts $FeSO_4 \cdot 7H_2O$, 94.0 parts diatomaceous earth and 103.7 parts of a colloidal silica solution containing 30% solids as 150 A. spherulites. This preparation is via the procedure and composition taught in the art. The mixture is processed at ambient temperature and the finished material is dried as is the procedure for other preparations. The catalyst thus derived is processed to produce 6–10 mesh granules. X-ray diffraction data indicated strong crystal development (undesirable), not only for the diatomaceous earth and its cristobalite content, but also for cesium sulfate as well as for an unidentified third crystal phase. Activity information were also derived and are also reported in the subsequent tabulation.

Example 11

A preparation is also made in the kneader-type equipment used in Example 10 with the following ingredients being added (outside scope of invention). Approximately 38 parts by weight of ammonium metavanadate, 124 parts by weight of cesium sulfate, 60 parts by weight of potassium sulfate, 12 parts by weight of iron sulfate, 31 parts by weight of silica derived from colloidal silica of the type used in Example 10, and 179 parts being diatomaceous earth of the type used in Example 10.

Water is added to the foregoing charge in sufficient quantity (about 70 parts) to give a paste having the consistency of thick grease. The reaction is at no time heated via steam application to the jacket of the kneader.

The paste is dried and calcined (500° C., 6 hours) and processed to 6–10 mesh granules. The X-ray pattern of the resultant material both before and after testing shows a strong pattern for cesium sulfate, crostobalite from the diatomaceous earth, and an unidentified pattern not related to any known cesium or vanadium compounds. By known is meant that no matching pattern of these compounds were found in the A.S.T.M. X-ray pattern standards. Activity information on this catalyst is also shown in the subsequent tabulation. Because of the high cost of the cesium in this preparation and that of Example 10, it would be economically unacceptable when contrasted to the more efficient use of the cesium by the procedure described in Examples 1 and 2.

Example 12

This example is similar to that preparation described in Example 1 with the exception that the potassium chrome alum is present to the extent of only 10 parts instead of the 40 parts and the potassium sulfate is added to the extent of 70 parts instead of 40 parts. All other operations and ingredients are the same as for Example 1. Activity data for this preparation are also tabulated subsequently.

Example 13

This preparation is similar to Example 12 with the exception that the quantity of potassium chrome alum added is 70 parts and the quantity of potassium sulfate added is 10 parts. Activity information was derived on the finished catalyst and are tabulated subsequently.

Example 14

In this example the procedure and ingredients are the same as in Example 13 with the exception that 3 parts by weight of iron sulfate is used and no cobalt or nickel sulfates are added. The activity information on this preparation is also tabulated subsequently.

Example 15

The procedure followed in this example is the same as that employed for Example 14 except that instead of using 3 parts by weight of iron sulfate, there is used 3 parts by weight of cobalt sulfate. The activity information for the catalyst resulting from this preparation are also tabulated subsequently.

Example 16

The procedure used in this preparation and ingredients are the same as those used in Example 15 with the exception that 3 parts by weight of nickel sulfate is used to replace the 3 parts by weight of cobalt sulfate. Activity information is tabulated subsequently.

Example 17

The procedure of this example is the same as that used in Example 1 with the exception that instead of using colloidal silica having a diameter of 70 A., a colloidal silica having a diameter of 150 A. is used. Activity information is tabulated subsequently.

Example 18

The procedure and ingredients used in this example are the same as those used in Example 17 with the exception that instead of using colloidal silica having a 150 A. spherulite diameter the spherulites are 250 A. in diameter. The results of the activity testing for this catalyst are also tabulated subsequently.

Example 19

The preparation of this example is the same as that employed in Example 1, with the exception that instead of using a finely divided diatomaceous earth one uses a coarse diatomaceous earth, the two differing in that the fine material has particle size uniformly less than 40 microns, whereas the coarse material has particles as large as 80 microns. Chemical composition is the same. The catalyst derived from this procedure was evaluated and the activity data are tabulated subsequently.

The quantity and type of colloidal silica was varied in similar preparations and in all cases the presence of the colloidal silica improved the product over a product containing only the diatomaceous earth type silica.

Example 20

The product of this example is prepared similarly to the procedures previously described with the exception that the active ingredients are coated in and onto typical support materials (as opposed to preparing a homogeneous mixture or slurry containing the carrier in finely divided form). This procedure is a frequently employed process when it is desired to minimize the use of costly ingredients.

The procedure consists in dissolving 40 parts by weight of ammonium metavanadate, 56 parts by weight of a 50% solution of cesium hydroxide, and 41 parts by weight of potassium aluminum sulfate

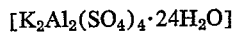

$$[K_2Al_2(SO_4)_4 \cdot 24H_2O]$$

All are dissolved in sufficient distilled water to provide a total of 750 parts by weight total solution. At 80° C. a yellowish precipitate forms when the potassium aluminum sulfate is added to the solution of cesium vanadate. Twenty-five percent of the solution-slurry is applied to 200 parts by weight of ⅛″ pellets of a silica-alumina cracking catalyst comprising 87% $SiO_2$ and 12% $Al_2O_3$. The slurry and pellets are stirred and heated until the solids are coated onto the pellets.

A further 25% of the solution-slurry is coated similarly onto ⅛″ pellets of "Norton alpha alumina" designated "SA101."

Thereafter, a solution-slurry is prepared comprising 200 parts of distilled water, 2 parts by weight of nickel sulfate pentahydrate and 2 parts by weight of colloidal silica derived by the oxidation of silicon tetrachloride to silicon oxide. Such silica is designated Cab-O-Sil.

The remaining ½ of the slurry prepared in the second paragraph of this example comprising the cesium vanadate and potassium aluminum sulfate is mixed with the slurry comprising the nickel sulfate and the colloidal silica. After these have been thoroughly mixed, this slurry is also divided into two portions.

The material comprising the silica alumina cracking catalyst coated with the cesium vanadate is coated again with ½ of the slurry just prepared and is designated 20A. The alumina cylinders also previously coated with the cesium vanadate and potassium aluminum sulfate are coated with the remaining ½ of the slurry just prepared and become 20B. Both are dried and then both are examined to determine activity. Activity information is recorded in Table I.

It will be noted that catalyst prepared as coating in and on supports is relatively low in activity.

Example 21

A preparation is made similar to Example 20 with the exception that the active ingredients are intimately mixed with diatomaceous earth and colloidal silica instead of being coated onto the exterior of the supports used in Example 20.

Forty parts by weight of ammonium metavanadate and 56 parts by weight of a 50% solution of cesium hydroxide are dissolved in sufficient distilled water to produce 400 parts by weight of solution at 85° C. to provide $CsVO_3$.

A solution-slurry is prepared by dissolving 41 parts by weight of potassium aluminum sulfate·$24H_2O$, 2 parts by weight of $NiSO_4 \cdot 5H_2O$, 150 parts by weight of diatomaceous earth and sufficient distilled water to produce 650 parts by weight of total solution.

While the cesium vanadate solution prepared in the second paragraph is being rapidly agitated, the solution-slurry prepared in the third paragraph is added over a period of 30 seconds. Four hundred seventy-five parts by weight of colloidal silica solution containing 141 parts of $SiO_2$ as 150 A. spherulites is next added over a period of 30 seconds to the slurry.

This solution-slurry is heated at 70° C. for a period of 1 hour with rapid agitation to assure uniformity, then is poured into an evaporating dish and is evaporated to dryness at 150° C. with constant stirring to keep uniform.

The product thus produced is crushed and screened to 6–10 mesh granules and given an activity test which is recorded in Table I.

It will be noted that the catalyst of this example is much more active and efficient than that of Example 20, despite the fact that they both have similar composition and differ primarily in that the poorer is coated onto a granular relatively large support and the other has the finely divided support and other ingredients uniformly intermixed.

Example 22

This example is provided to record the preparation of standards for X-ray pattern identification. The standard for cesium vanadate examination was prepared using the ingredient quantities and procedure described for the first solution (first paragraph) of Example 1. This solution was evaporated to dryness and crystals were removed at four separate stages during drying. These provided the material from which X-ray pattern was derived. Cesium vanadate X-ray patterns are not available in A.S.T.M. standards. A second preparation was made in which the same quantity of ammonium metavanadate and cesium hydroxide was subjected to reaction conditions following the exact procedure of Example 1, but a quantity of cesium sulfate equal to 25% of the weight of ammonium metavanadate was also added together with 5 parts by weight of sulfuric acid ($H_2SO_4$). This solution also was evaporated to dryness but only a single crop of crystals was obtained. These crystals were used in the X-ray pattern identification.

The standard for chromium potassium sulfate, potassium sulfate, cesium sulfate were all obtained on commercially available salts. Ammonium metavanadate pattern is shown in the A.S.T.M. standards but a salt also was examined by X-ray diffraction to determine if the pattern obtained would coincide with the pattern provided in A.S.T.M., which proved to be the case.

TABLE I.—PERFORMANCE DATA FOR CATALYSTS PREPARED IN THE EXAMPLES

| Example number: | Space velocity, vol. gas/hr. cat. vol. | Hot spot, °C. | $SO_2$ in $SO_3$* free effluent | Single or dual catalyst |
|---|---|---|---|---|
| 1 | 2,400 | 505 | .17 | 1 |
| 1 | 3,600 | 454 | .29 | 2 |
| 1 (commercial ingredients) | 3,600 | 460 | .37 | 2 |
| 1-Vendor 1 | 3,600 | 457 | .34 | 2 |
| 1-Vendor 2 | 3,600 | 480 | .40 | 2 |
| 1-Vendor 3 | 3,600 | 456 | .38 | 2 |
| 2 | 3,600 | 458 | .25 | 2 |
| 3 | 3,600 | 450 | .23 | 2 |
| 4-Granular | 3,600 | 457 | .28 | 2 |
| 4-Extrudate | 3,600 | 454 | .27 | 2 |
| 5 | 3,600 | 457 | .27 | 2 |
| 6 | 3,600 | 464 | .31 | 2 |
| 7 | 3,600 | 458 | .26 | 2 |
| 8 | 3,600 | 458 | .27 | 2 |
| 9 | 3,600 | 450 | .26 | 2 |
| 10 | 2,400 | 530 | .42 | 1 |
| 11 | 2,400 | 538 | .46 | 1 |
| 12 | 3,600 | 449 | .30 | 2 |
| 13 | 3,600 | 460 | .38 | 2 |
| 14 | 3,600 | 460 | .32 | 2 |
| 15 | 3,600 | 456 | .35 | 2 |
| 16 | 3,600 | 452 | .29 | 2 |
| 17 | 3,600 | 450 | .27 | 2 |
| 18 | 3,600 | 446 | .28 | 2 |
| 19 | 3,600 | 452 | .30 | 2 |
| 20A | 2,400 | >600 | >2.0 | 1 |
| 20B | 2,400 | >650 | >3.0 | 1 |
| 21 | 2,400 | 535 | 0.3 | 1 |

*Low value indicates better performance.

I claim:

1. A process for preparing a high efficiency $SO_2$ to $SO_3$ oxidation catalyst which comprises preparing a homogeneous mixture comprising a catalytically effective amount of a primary catalytic material selected from the group of $CsVO_3$ and $RbVO_3$, a promoter selected from the group consisting of alkali metal sulfates, potassium aluminum sulfate, chromium potassium sulfate and mixtures thereof, a carrier material, and at least one activator selected from the group consisting of the sulfates of cobalt, nickel, and iron as their hydrates; and then drying the mixture to provide the catalyst.

2. The process of claim 1 wherein the catalyst is formed into self-supporting shapes.

3. The process of claim 1 wherein the primary catalytic material is $CsVO_3$.

4. The process of claim 3 wherein the $CsVO_3$ is preformed prior to preparing the mixture in the form of a slurry.

5. The process of claim 4 wherein the catalyst is formed into self-supporting shapes.

6. The process of claim 4 wherein the $CsVO_3$ is preformed by subjecting $CsOH$ and $NH_4VO_3$ to reaction conditions to provide the $CsVO_3$.

7. The process of claim 3 wherein the catalyst is calcined.

8. The process of claim 7 wherein the catalyst is calcined by heating to a temperature within the range of 250° C. to 800° C.

9. The process of claim 3 wherein the $CsV_3$ is formed in the mixture in situ by including reactants that form $CsVO_3$ in the mixture and heating the mixture to reaction temperature to provide the $CsVO_3$.

10. The process of claim 9 wherein the temperature is within the range of 50° C. to 100° C.

11. The process of claim 9 wherein the reactants are $CsOH$ and $NH_4VO_3$.

12. The process of claim 3 wherein the promoter comprises an alkali metal sulfate.

13. The process of claim 12 wherein the promoter comprises chromium potassium sulfate.

14. The process of claim 13 wherein the chromium potassium sulfate is of the formula $K_2Cr_2(SO_4)_4 \cdot 24H_2O$.

15. The process of claim 3 wherein the carrier material comprises a mixture of diatomaceous earth and colloidal silica.

16. The process of claim 3 wherein the promoter comprises a mixture of $K_2Cr_2(SO_4)_4 \cdot 24H_2O$ and potassium sulfate.

17. The process of claim 3 wherein the promoter comprises $K_2Cr_2(SO_4)_4 \cdot 24H_2O$ and $Cs_2SO_4$.

18. The process of claim 3 wherein the promoter comprises a mixture of $K_2Cr_2(SO_4)_4 \cdot 24H_2O$ and rubidium sulfate.

19. The process of claim 4 wherein silver vanadate is preformed along with the $CsVO_3$ and added to the mixture.

20. The process of claim 4 wherein sodium vanadate is preformed along with the $CsVO_3$ and added to the mixture to provide a catalyst.

21. The process of claim 4 wherein an excess of vanadate ions is introduced into the slurry along with the preformed $CsVO_3$.

22. The process of claim 4 wherein the promoter comprises chromium potassium sulfate.

23. The process of claim 22 wherein the promoter comprises $K_2Cr_2(SO_4)_4 \cdot 24H_2O$ and potassium sulfate.

24. The process of claim 23 wherein the carrier material comprises a mixture of diatomaceous earth and colloidal silica.

25. The process of claim 24 wherein at least one activator selected from the group of activators consisting of the sulfates of Co, Ni, and Fe as their hydrates is included in the mixture that is made into a slurry.

26. The process of claim 25 wherein at least two of the activators are included in the slurry.

27. The process of claim 25 wherein an excess of vanadate ions is introduced into the slurry along with the preformed $CsVO_3$.

28. A catalyst prepared by the process of claim 1.
29. A catalyst prepared by the process of claim 3.
30. A catalyst prepared by the process of claim 5.
31. A catalyst prepared by the process of claim 13.
32. A catalyst prepared by the process of claim 15.
33. A catalyst prepared by the process of claim 24.
34. A catalyst prepared by the process of claim 25.
35. A catalyst prepared by the process of claim 19.

References Cited

UNITED STATES PATENTS 1,941,426   12/1933   Beardsley et al. ____ 252—456 X
1,941,427   12/1933   Beardsley et al. ____ 252—456 X DANIEL E. WYMAN, Primary Examiner W. J. SHINE, Assistant Examiner U.S. Cl. X.R.

252—456, 464, 476